April 12, 1955     C. W. SHERWIN     2,705,901

OSCILLOGRAPHIC INTEGRATOR

Filed Jan. 15, 1946

*INVENTOR.*
CHALMERS W. SHERWIN

BY

ATTORNEY

United States Patent Office 2,705,901
Patented Apr. 12, 1955

2,705,901

OSCILLOGRAPHIC INTEGRATOR

Chalmers W. Sherwin, Belmont, Mass., assignor, by mesne assignments, to the United States of America as represented by the Secretary of the Navy Application January 15, 1946, Serial No. 641,346

4 Claims. (Cl. 88—14)

This invention relates in general to integrating systems and more particularly to an electronic system for integrating a graph or curve and is particularly applicable in connection with computers of various types.

Heretofore, integration has been accomplished by mechanical means as for example by a planimeter or by mathematical analysis. Both of these methods are laborious, time consuming, and subject to human errors.

An object of this invention is to provide an electronic integrator.

Another object of the present invention is to provide simplified, accurate apparatus for automatically computing an integral.

A further object of this invention is to provide an integrating device for measuring the area under a curve by electronic scanning.

These and other objects will be apparent from the following specification when taken with the accompanying drawing in which.

Figure 1:
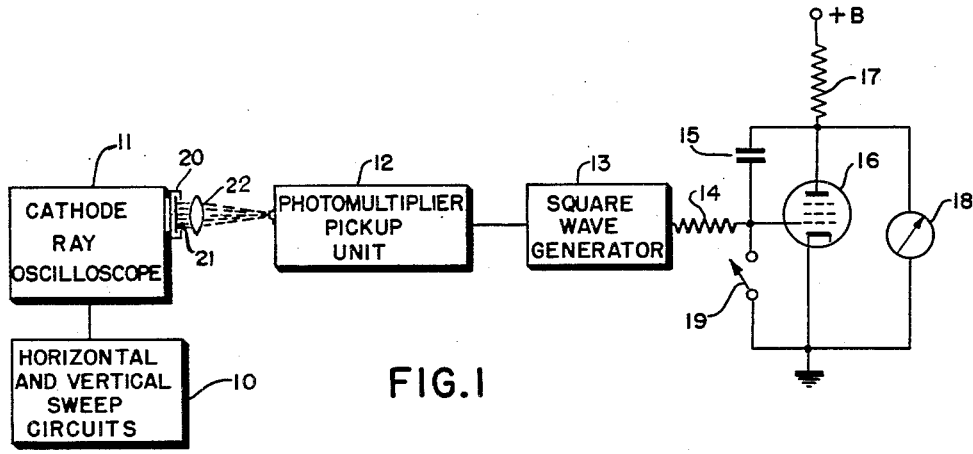
Fig. 1 is generally a block diagram of one form of the invention.
Figure 2:
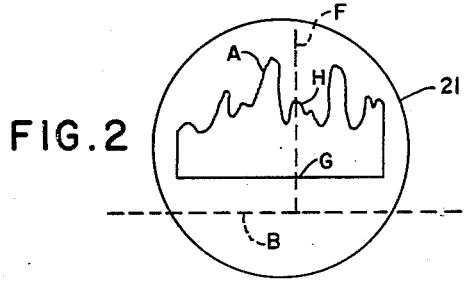
Fig. 2 is a representation of the general type of curves which may be integrated.

Referring to the drawings and particularly to Fig. 1, the horizontal and vertical sweep circuits 10 deliver saw tooth voltages simultaneously to horizontal and vertical deflection plates respectively in the cathode ray oscilloscope 11. The horizontal sweep is generated as a linear voltage and the sweep time is comparatively long, approximately 0.2 second for one sweep in the present example. The vertical sweep is also generated as a linear voltage and is comparatively short, that is approximately one millisecond per sweep. Thus, during one horizontal sweep of the cathode ray beam there will be (for the conditions taken above) 200 vertical sweeps of the cathode ray beam. These recurrent vertical sweeps in combination with the horizontal sweep form a scanning raster, essentially as obtained in a single scan in a television system. The curve or graph to be integrated is drawn on a transparent material 21 to a scale which will conveniently fit over the screen of the cathode ray tube. Such a curve is indicated in Fig. 2 as A. The dashed line B indicates the location of the start of the series of vertical sweeps of the cathode ray beam. The transparent material 21 on which the curve is drawn is held over the face of the cathode ray tube by a holder 20 which may conveniently be fastened to the cathode ray oscilloscope housing. An optical condensing lens system 22 is interposed between the transparent material 21 and a photo-multiplier pick-up unit 12 to focus the light transmitted through the transparent material upon a photocell incorporated in the photomultiplier pick-up unit 12.

Photomultiplier pickup unit 12 or other photoelectric system detects the variations in light intensity as the cathode ray beam sweeps upward and crosses the curve A. These variations in light intensity are converted into pips as is shown at D on Fig. 3 which are used to trigger square wave generator 13. The square wave output E (Fig. 3) of generator 13 is fed to the simplified integrator circuit composed of resistor 14, condenser 15, tube 16, and plate resistor 17. Indicating device 18, when read upon the completion of the horizontal sweep, gives a value which is directly proportional to the area enclosed by curve A. A clamping circuit incorporated in the horizontal sweep circuit 10 and schematically represented by the switch 19 is closed during the return trace of the scanning beam and open during the operation of scanning the curve A.

Figure 3:
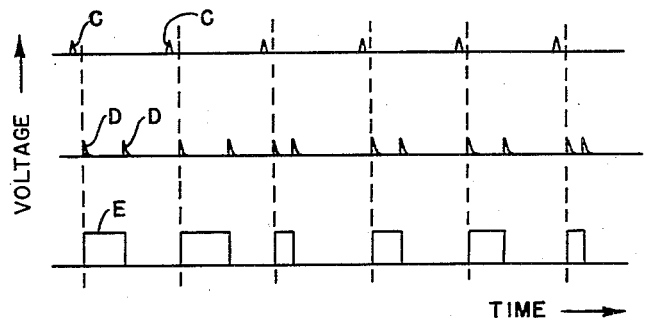
Fig. 3 is a series of wave forms depicting time relationships of the generated square waves with respect to the vertical scans.

In operation the horizontal scan is initiated, thereby opening the clamping circuit 19. Vertical scans are regularly started by each pip C of a series (Fig. 3) spaced equally in time. As the vertical scan moves up the cathode ray screen from line B, it will cross the base line of curve A and later cross curve A as is indicated on the scanning line F by the two points G and H respectively. At these two crossings, the light intensity furnished to the photomultiplier pickup circuit 12 will be decreased. The first decrease in intensity is transformed into a first pip D which initiates the square wave E (Fig. 3). The following decrease in light intensity at H is transformed into a second pip D which ends the square wave E. Circuits for accomplishing this are known as "scale of two" counters. Thus, the duration or length of the wave E obtained for each vertical scan is determined by the distance between the base line of the curve and the curve itself. By scanning the curve with, say, 200 vertical scans for every horizontal trace, a series of rectangular waves of variable duration is generated whose only parameter is time, that is, they reoccur at regular time intervals; their amplitude is constant; and their length is proportional to the height of the curve at the time of each vertical sweep.

These square waves E are then fed into the integrating circuit. Prior to the beginning of the horizontal scan and when the clamping circuit 19 is closed, condenser 15 is charged to a potential whose value is determined by the characteristics of tube 16, resistor 17 and the power supply B+ voltage. Each square wave E applied to the grid of tube 16 discharges condenser 15 by an amount proportional to the length of the square wave E. Thus, when the scan is complete, the periodic discharge of the condenser 15 provides the equivalent of summing up the areas of all the square waves, which is the fundamental theory of integration. The reading of indicating device 18, preferably a voltmeter, is directly proportional to the area enclosed by curve A.

The invention described need not be limited to the details shown, which are considered to be illustrative of one form the invention may take.

What is claimed is:

1. Apparatus for electronically integrating a complex function, said function being plotted as a curve in rectangular coordinates on transparent material, comprising, a cathode ray tube having a fluorescent screen, a photoelectric device facing said screen, means for positioning the plot of said function between said screen and said photoelectric device, means for deflecting the cathode ray beam of said tube to scan the area of said plot in a rectangular scanning pattern to develop in the output circuit of said photoelectric device a pulse at each intercept of said beam with the abscissa and the curve of said plot, a square wave generator responsive to said output pulses for each intercept of said curve to produce a square wave having a time duration proportional to the value of the ordinate of said curve of said function at the point of intercept, an integrating circuit responsive to said square waves for the time interval of a complete scanning pattern over the area of said plot to provide an output voltage proportional to the summation of the areas of said square waves, and means for restoring said integrator output voltage to a predetermined initial amplitude at the start of a scanning pattern of said plot.

2. Apparatus for electronically integrating a complex function, said function being plotted as a curve in rectangular coordinates on transparent material, comprising, a cathode ray tube having a fluorescent screen, a photoelectric device facing said screen, means for positioning the plot of said function between said screen and said photoelectric device, means for deflecting the cathode ray beam of said tube slowly in a horizontal direction and rapidly in a vertical direction to scan the area of said plot in a predetermined rectangular scanning raster to develop in the output circuit of said photoelectric device a pulse at each intercept of said beam vertically with the abscissa and the curve of said plot, a square wave generator responsive to said output pulses for each intercept of said beam with said curve to produce a square wave having a time duration proportional to the value of said curve of the ordinate of said function at the point of intercept, an integrating circuit responsive to said square waves for the time interval of a complete scanning raster over the area of said plot to provide an output voltage proportional to the summation of the areas of said square waves, whereby an indicator responsive to said integrator output voltage displays the value of the integral of said complex function.

3. Apparatus for electronically integrating a complex function, said function being plotted as a curve in rectangular coordinates on transparent material, comprising, a cathode ray tube having a fluorescent screen, a photoelectric device facing said screen, means for positioning the plot of said function between said screen and said photoelectric device, means for deflecting the cathode ray beam of said tube horizontally and vertically to scan said plot in a rectangular scanning raster to develop in the output circuit of said photoelectric device a pulse at each intercept of said beam vertically with the abscissa and the curve of said plot, a square wave generator responsive to said output pulses to produce a square wave initiated at the intercept of said beam with said abscissa and terminated at the intercept of said beam with said curve having a time duration proportional to the value of the ordinate of said function at each point of intercept, an integrating circuit responsive to said square waves for the time interval of a complete scanning raster over the area of said plot to provide an output voltage proportional to the summation of the areas of said square waves, and means for restoring said integrator output voltage to a predetermined initial value at the start of a scanning raster of said plot.

4. Apparatus for electronically integrating a complex function, said function being plotted as a curve in rectangular coordinates on transparent material, comprising, a cathode ray tube having a fluorescent screen, a photoelectric device facing said screen, means for positioning the plot of said function between said screen and said photoelectric device, means for deflecting the cathode ray beam of said tube slowly in a horizontal direction and rapidly in a vertical direction to scan the area of said plot in a predetermined rectangular scanning raster to develop in the output circuit of said photoelectric device a pulse at each intercept of said beam vertically with the abscissa and curve of said plot, a square wave generator responsive to said output pulses for each intercept of said beam with said curve to produce a square wave having a time duration proportional to the value of the ordinate of the curve of said function at the point of intercept, an integrating circuit responsive to said square waves for the time interval of a complete scanning raster over the area of said plot to provide an output voltage proportional to the summation of the areas of said square waves, and means for restoring said integrator ouput voltage to a predetermined initial value at the start of each scanning raster.

References Cited in the file of this patent

UNITED STATES PATENTS

| | | |
|---|---|---|
| 2,075,140 | Schlesinger | Mar. 30, 1937 |
| 2,098,326 | Wente | Nov. 9, 1937 |
| 2,188,679 | Dovaston et al. | Jan. 30, 1940 |
| 2,360,883 | Metcalf | Oct. 24, 1944 |
| 2,402,058 | Loughren | June 11, 1946 |
| 2,410,550 | Padva | Nov. 5, 1946 |
| 2,415,190 | Rajchman | Feb. 4, 1947 |